US012379100B1

(12) United States Patent
Lee

(10) Patent No.: US 12,379,100 B1
(45) Date of Patent: Aug. 5, 2025

(54) LIGHTING DEVICE MOUNTING MECHANISM

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 0 days.

(21) Appl. No.: 18/991,657

(22) Filed: Dec. 22, 2024

(51) Int. Cl.
*F21V 21/096* (2006.01)
*F21V 21/084* (2006.01)

(52) U.S. Cl.
CPC .......... *F21V 21/096* (2013.01); *F21V 21/084* (2013.01); *F21V 21/0965* (2013.01)

(58) Field of Classification Search
CPC .. F21V 21/084; F21V 21/0885; F21V 21/096; F21V 21/0965; F21V 21/30; F21L 4/04; F21L 4/045
USPC ........................................ 362/285, 287, 427
See application file for complete search history.

(56) References Cited

U.S. PATENT DOCUMENTS

| | | | | |
|---|---|---|---|---|
| 2020/0281297 A1* | 9/2020 | Kaye | ................... | F21V 23/0471 |
| 2021/0003270 A1* | 1/2021 | Lee | ........................ | H01R 11/30 |
| 2022/0178522 A1* | 6/2022 | Cabot | ................. | F21V 21/0816 |
| 2023/0028455 A1* | 1/2023 | Williams | ................ | F21V 21/30 |

* cited by examiner

*Primary Examiner* — Thomas M Sember

(57) ABSTRACT

A lighting device mounting mechanism includes a lamp holder with a lighting device connected to one side thereof. The other side has a first magnetic component and two recessed slots. A positioning base combines with the side of the lamp holder containing the first magnetic component. The positioning base has two protruding mounting ridges that engage with the slots. A second magnetic component is located between the mounting ridges and is installed at an incline in the positioning base with one end close to the first magnetic component and the other end away from it. The magnetic attraction between the first and second magnetic components automatically guides the lamp holder to be attached to the positioning base, and secures the position through the dynamic interlocking of the mounting ridges with their corresponding slots. This prevents easy separation of the lamp holder from the positioning base due to external impact forces.

12 Claims, 15 Drawing Sheets

LIGHTING DEVICE MOUNTING MECHANISM

BACKGROUND OF THE INVENTION

1. Fields of the Invention

The present invention relates to a technology in the field of illumination, and more particularly, to a lighting device mounting mechanism.

2. Descriptions of Related Art

In dim working environments and locations, to maintain operational efficiency, workers generally wear lighting equipment on their bodies. Similarly, night runners, to ensure safety during exercise, also wear lighting equipment. While there are many types of lighting equipment available in the market today, most options aim to free up both hands, making headlamps the most common choice. Referring to Taiwan Patent No. M628836 "Improved Headlamp Structure," while this headlamp structure allows users to wear it on their head, the mounting device and lighting equipment are secured only by magnetic force. Its stability can be easily compromised by slight external forces, causing the lighting equipment to detach from the mounting device, especially during head movements. This significantly increases the risk of damage to the lighting equipment.

Further referring to Taiwan Patent No. 1708576 "Anti-magnetic Detachment Buckle," while this design also provides for lighting equipment assembly, it requires complicated operations in first, second, and third directions to allow the locking block to horizontally engage with the locking space of the locked portion, and the auxiliary locking block to horizontally engage with the auxiliary locking space of the auxiliary locked portion. This not only makes the structure complex but also makes operation cumbersome. Additionally, regarding the various headlamps mentioned above, there is a common issue where users must remove the worn item (safety helmet) every time they need to assemble the headlamp. This situation is not only inconvenient but also poses potential safety risks.

The present invention intends to provide a lighting device mounting mechanism to eliminate the shortcomings mentioned above.

SUMMARY OF THE INVENTION

The present invention relates to a lighting device mounting mechanism and comprises a lamp holder with a lighting device pivotally connected to one side thereof, and the other side of the lamp holder has an embedded first magnetic component and two recessed slots. The first magnetic component is located between the two slots. A positioning base is detachably connected to the side of the lamp holder that has the first magnetic component. The positioning base has two protruding mounting ridges that are engaged with the two slots. The two mounting ridges are spaced apart with a second magnetic component installed between the two mounting ridges. The lamp holder and the positioning base are combined with each other through a magnetic force between the first magnetic component and the second magnetic component. The second magnetic component has a first end thereof close to the first magnetic component, and a second end of the second magnetic component is located away from the first magnetic component. The second magnetic component is mounted at an inclined angle in the positioning base. The side of the lamp holder containing the first magnetic component approaches the side of the positioning base containing the second magnetic component, the lamp holder is guided onto the positioning base, and the two mounting ridges are engaged with the corresponding slots.

The primary object of the present invention is to provide users with a quick and easy installation and removal process for lighting equipment, while ensuring the lighting equipment remains firmly secured after installation and won't easily detach due to external forces. It enables automatic guided assembly of lighting equipment with enhanced safety features. This improves upon the prior art by addressing issues such as the overly complicated assembly and disassembly operations between the lighting equipment and wearing device, as well as insufficient stability after assembly which can lead to detachment due to external forces.

The advantage of the present invention lies in the secure connection between the lamp holder and positioning base through the magnetic attraction between the first magnetic component and second magnetic component, combined with the interlocking assembly of the two mounting protrusions and two slots. This creates two types of positioning mechanisms between the lamp holder and positioning base. As a result, it prevents easy separation of the lamp holder from the positioning base due to external impact forces, while allowing quick and easy assembly without overly complex structures between the lamp holder and positioning base.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 2:
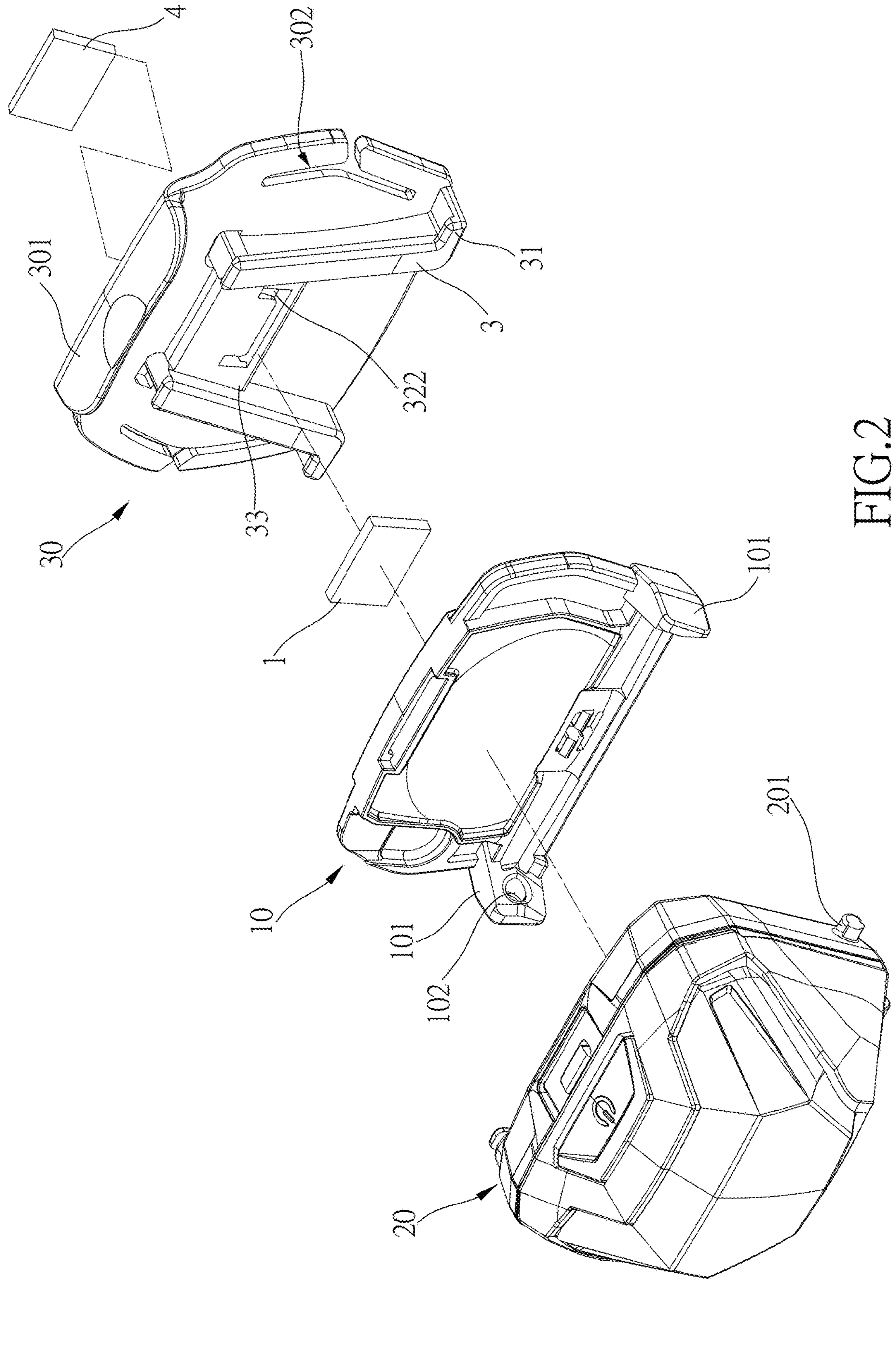
FIG. 2 is an exploded perspective view of the first embodiment of the present invention.
Figure 3:
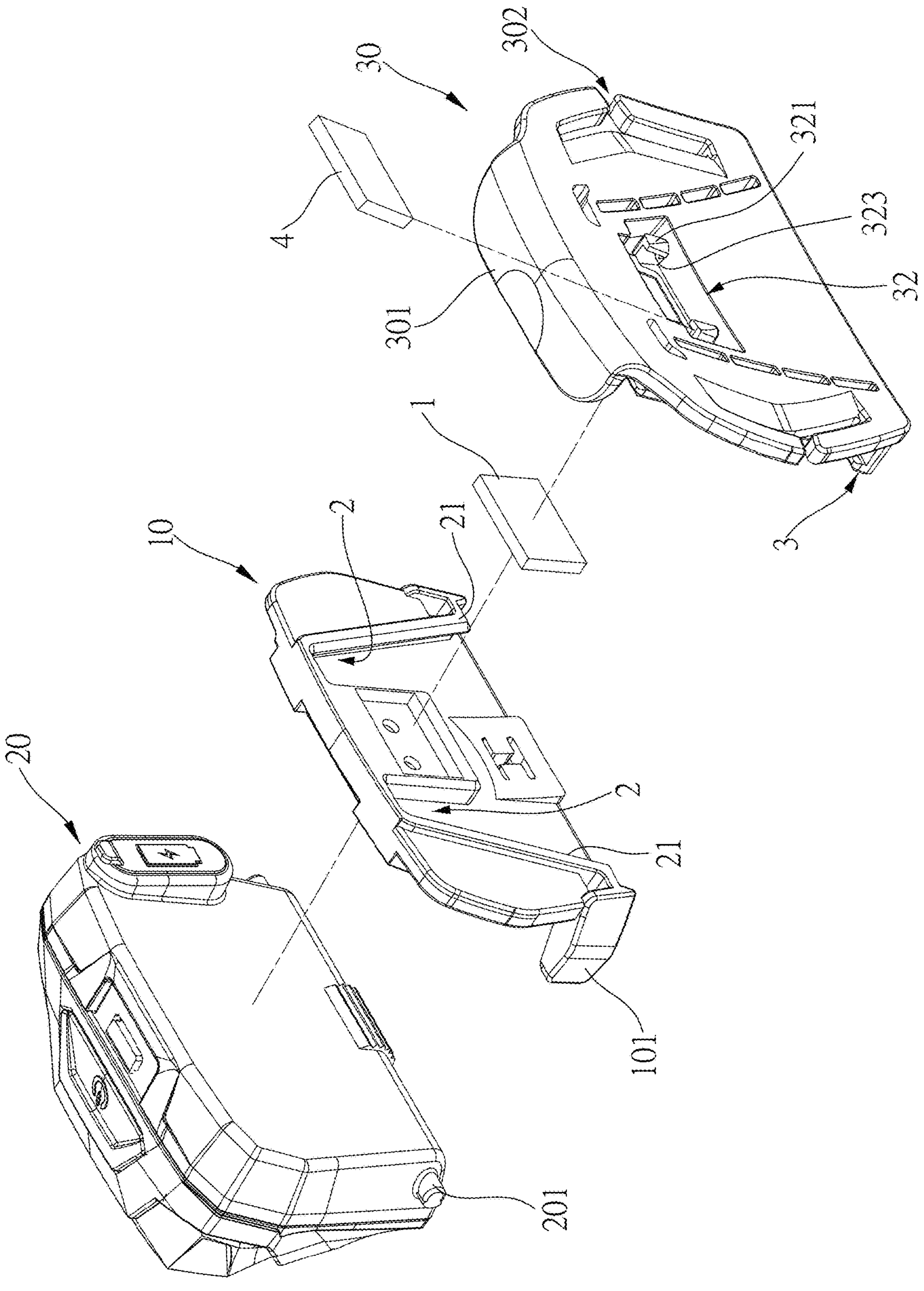
FIG. 3 is another angle of the exploded perspective view from FIG. 2.

Referring to FIGS. 1 to 14, two embodiments of the present invention are disclosed, wherein FIGS. 1 to 6 show the first embodiment of the lighting device mounting mechanism of the present invention and comprises a lamp holder (10) with a lighting device (20) pivotally connected to one side thereof, the other side of the lamp holder (10) having an embedded first magnetic component (1) and two recessed slots (2) as shown in FIG. 3. The first magnetic component (1) located between the two slots (2).

A positioning base (30) is detachably connected to the side of the lamp holder (10) that has the first magnetic component (1). The positioning base (30) has two protruding mounting ridges (3) that are engaged with the two slots (2). The two mounting ridges (3) are spaced apart with a second magnetic component (4) installed between the two mounting ridges (3). The lamp holder (10) and the positioning base (30) are combined with each other through a magnetic force between the first magnetic component (1) and the second magnetic component (4). The second magnetic component (4) has a first end thereof close to the first magnetic component (1) and a second end of the second magnetic component (4) located away from the first magnetic component (1). The second magnetic component (4) is mounted at an inclined angle in the positioning base (30), when the side of the lamp holder (10) containing the first magnetic component (1) approaches the side of the positioning base (30) containing the second magnetic component (4), the lamp holder (10) is guided onto the positioning base (30), and the two mounting ridges (3) are engaged with the corresponding slots (2).

Figure 6:
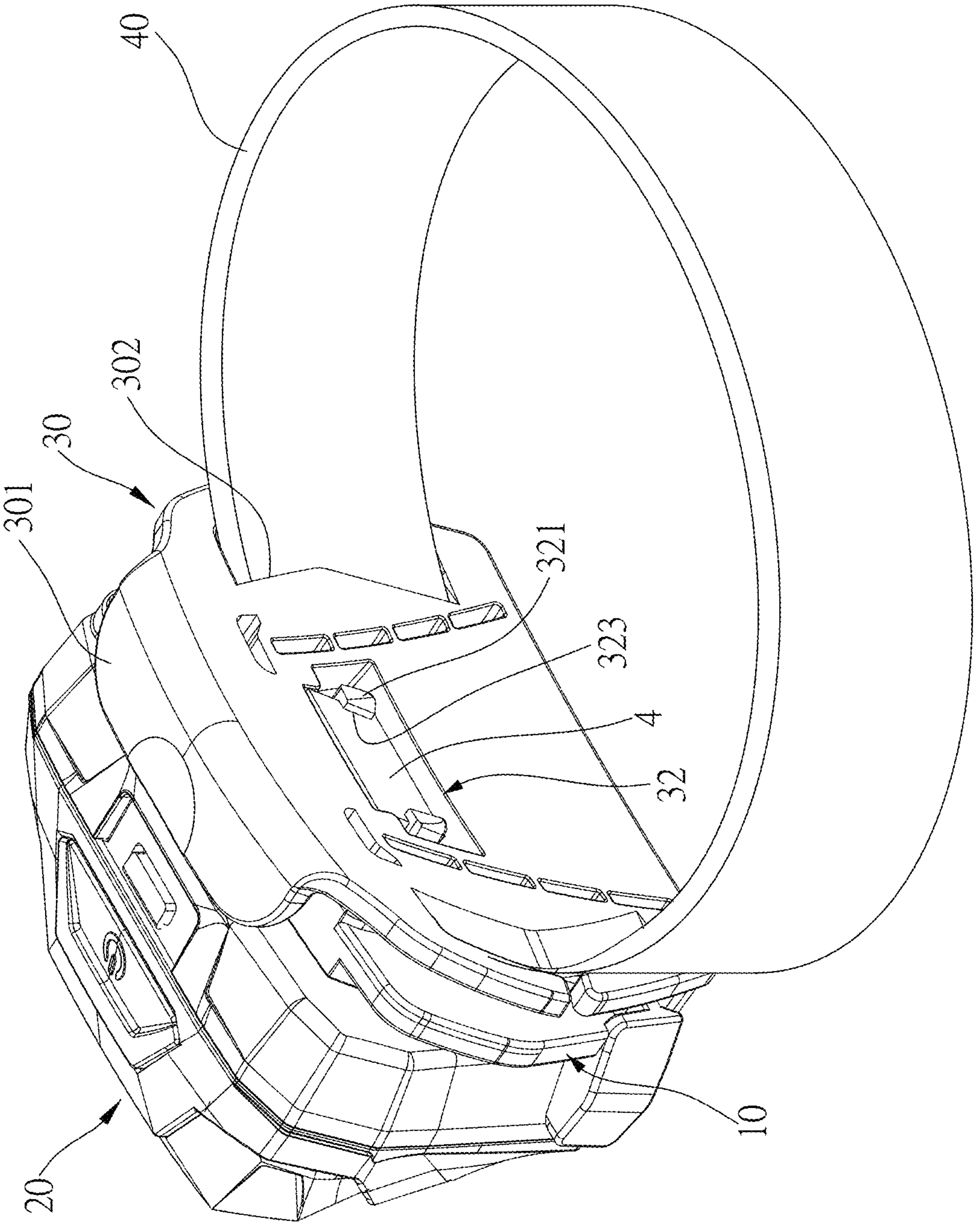
FIG. 6 is a perspective view showing the first embodiment applied to a rope assembly.
Figure 7:
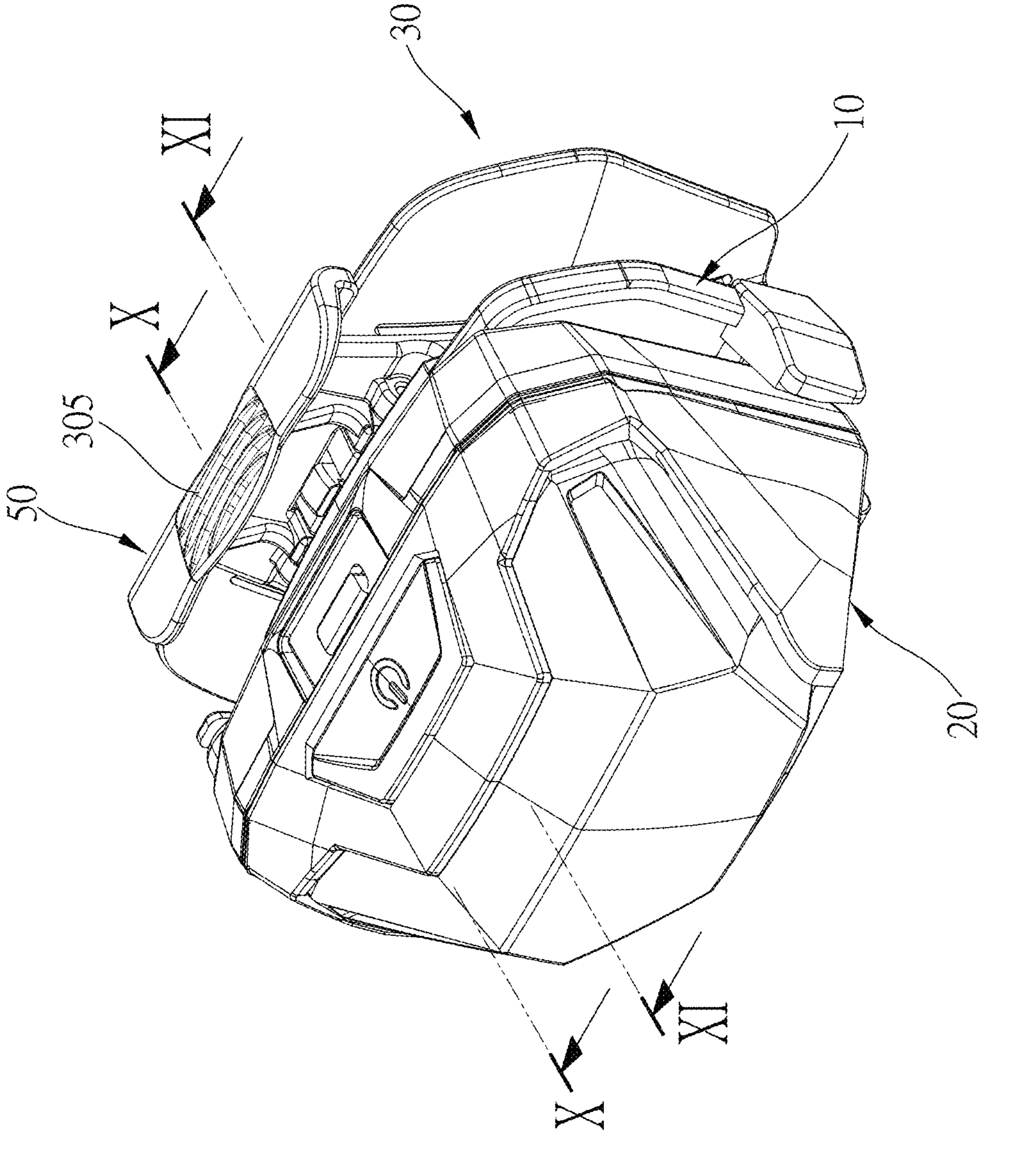
FIG. 7 is a perspective view of the second embodiment of the present invention.

As shown in FIG. 6, the present invention can be applied to a strap (40) (or headband) for use. When users are night running, to enhance safety during their run, they can wear the combination of the strap (40) and positioning base (30) on their head, and then install the lamp holder (10) with the lighting device (20) onto the positioning base (30). Users only need to bring the lamp holder (10) with the lighting device (20) close to the positioning base (30). During this approach, as the first magnetic component (1) and the second magnetic component (4) gradually get closer, the magnetic attraction between them becomes increasingly stronger. When the distance between the lamp holder (10) and the positioning base (30) becomes very small, the magnetic attraction between the first magnetic component (1) and the second magnetic component (4) will generate a stronger pulling force.

In other words, through the characteristics of the magnetic field, when the first magnetic component (1) and the second magnetic component (4) come close, they first attract each other and then automatically guide into position (due to the inclined design of the second magnetic component (4), the magnetic field direction also varies. Therefore, when the first magnetic component (1) approaches the second magnetic component (4), the magnetic field directions of both components will form an automatic guiding function as they attract each other). This causes the lamp holder (10) with the lighting device (20) to quickly combine with the positioning base (30), allowing each mounting ridge (3) to lock into each slot (2), so as to quickly complete the installation and assembly between the lamp holder (10) and positioning base (30). Furthermore, the second magnetic component (4) installed in the positioning base (30) has the first end thereof close to the first magnetic component (1) and the second end of the second magnetic component (4) away from the first magnetic component (1), resulting in an inclined installation of the second magnetic component (4) in the positioning base (30). This installation method achieves the maximum magnetic attraction between the first magnetic component (1) and the second magnetic component (4), and automatically guides and drives the combination of the lamp holder (10) and positioning base (30). It also prevents the lamp holder (10) from easily detaching from the positioning base (30), ensuring normal use of the lighting device (20).

As shown in FIG. 2, the present invention features a pivotal assembly between the lighting device (20) and the lamp holder (10) to allow users to adjust the illumination angle of the lighting device (20). Two protrusions (101) vertically protrude from the side where the lamp holder (10) is connected to the lighting device (20). Each protrusion (101) includes an axial hole (102) defined in an inner side thereof, and the two respective axial holes (102) face each other. The lighting device (20) has two pivots (201) pivotally assembled into the axial holes (102), so that the lighting device (20) is pivotable relative to the lamp holder (10).

Figure 1:
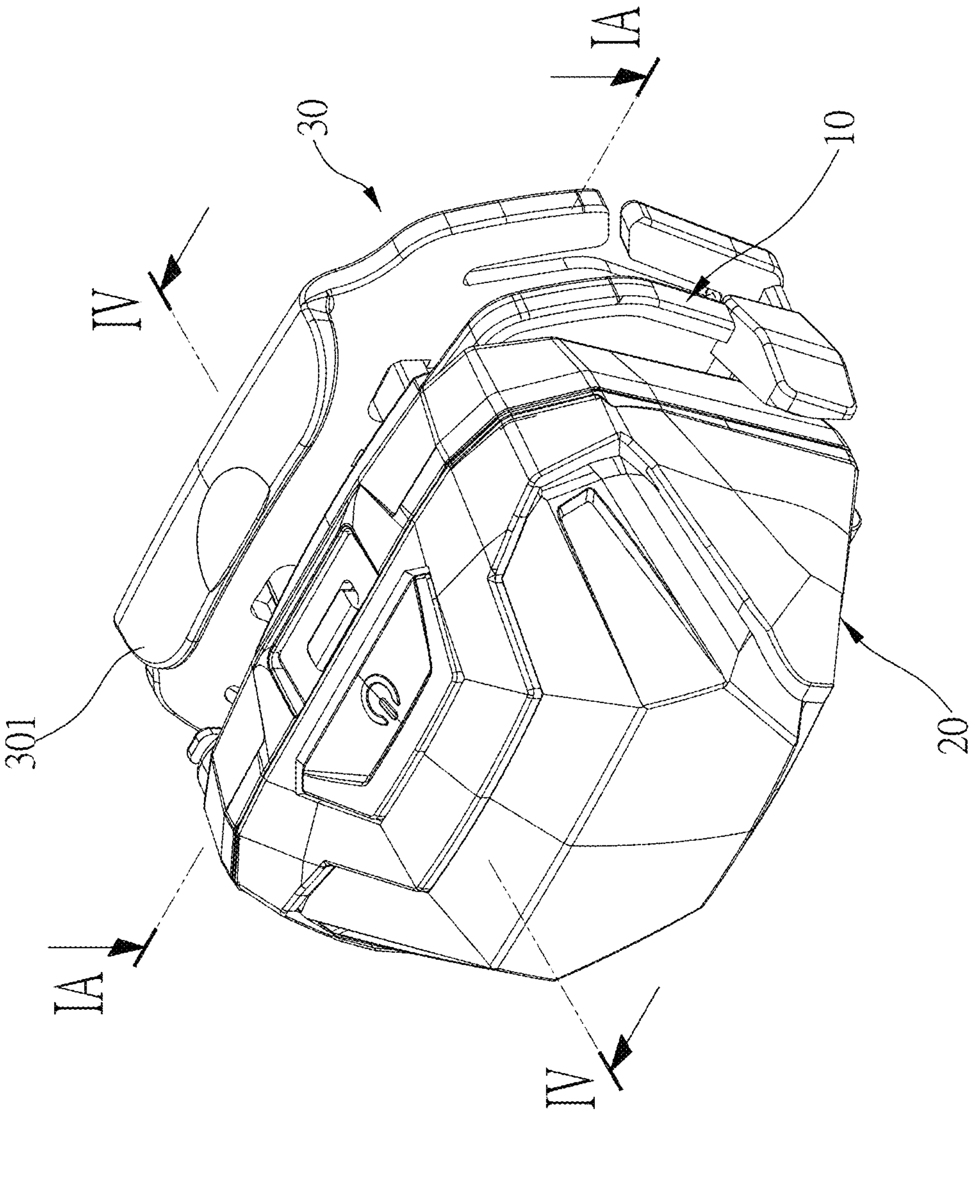
FIG. 1 is a perspective view of the first embodiment of the present invention.
Figure 1A:
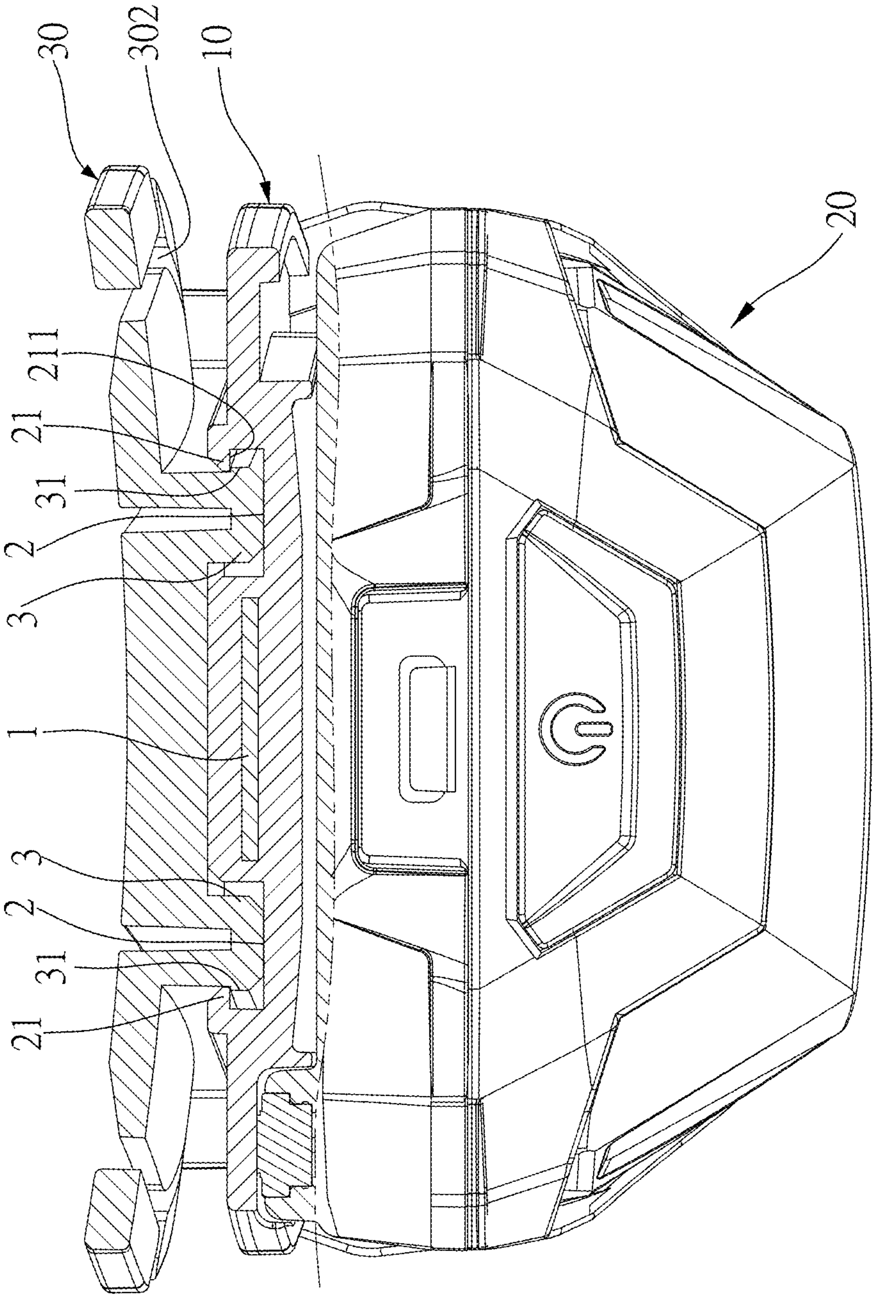
FIG. 1A is a sectional view, taken along line IA-IA of FIG. 1.

As shown in FIGS. 1A and 3, a first blocking plate (21) extends from each slot (2) of the lamp holder (10) and toward the first magnetic component (1). A stopping surface (211) is formed on an inside side of each first blocking plate (21) corresponding to an interior of the slot (2). Each mounting ridge (3) of the positioning base (30) has a second blocking plate (31) extending therefrom. When the lamp holder (10) approaches the positioning base (30) and is magnetically assembled through the magnetic force between the first magnetic component (1) and the second magnetic component (4), the second blocking plate (31) instantly engages with the slot (2) corresponding thereto, and an outer surface of each second blocking plate (31) abuts against the stopping surface (211) of each first blocking plate (21). As a result, after the lamp holder (10) and the positioning base (30) are interlocked together, they achieve better stability and the lamp holder (10) does not detach from the positioning base (30) due to external forces.

Figure 4:
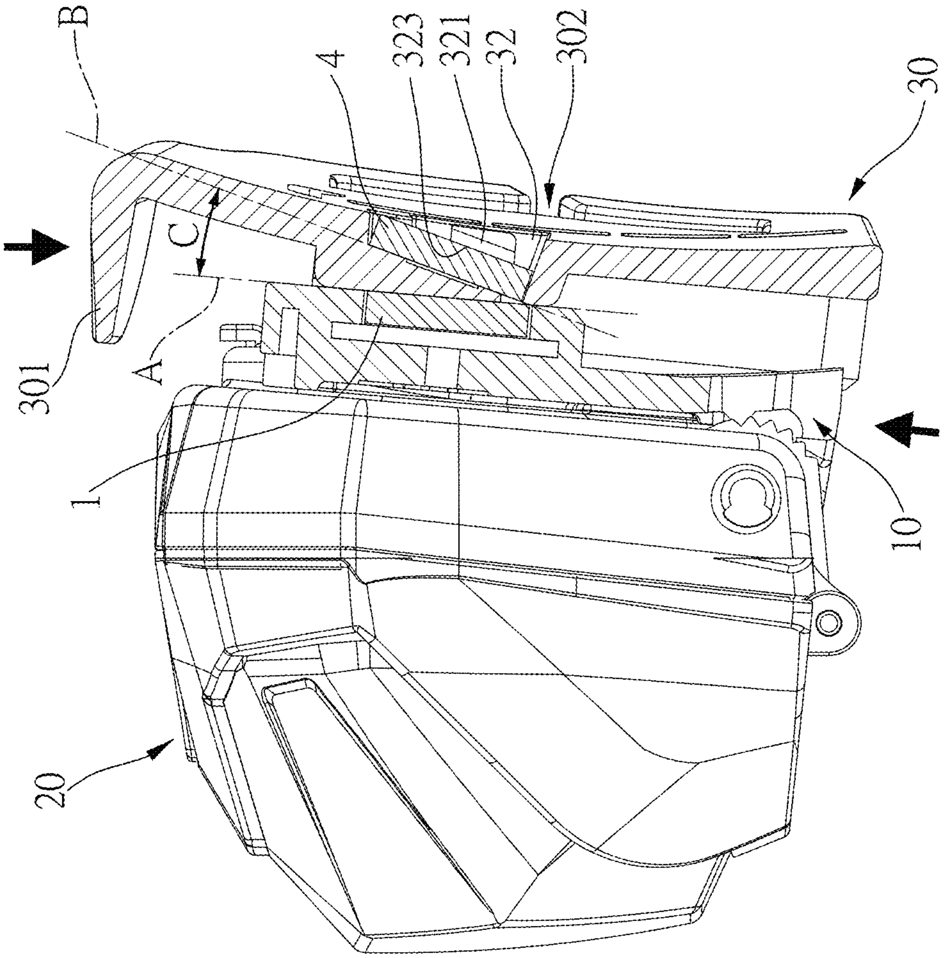
FIG. 4 is a sectional view, taken along line IV-IV of FIG. 1.
Figure 5:
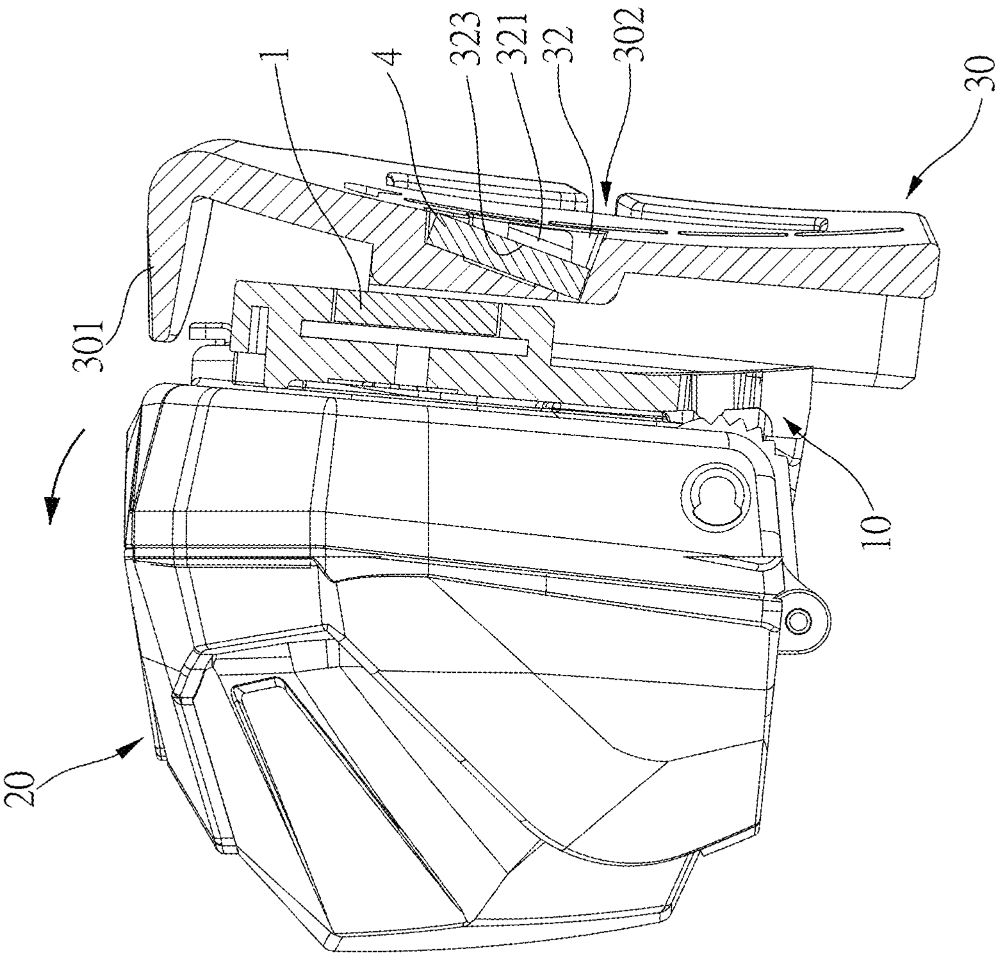
FIG. 5 is an operational view showing the detachment of the lamp holder from the positioning base in FIG. 4.

As shown in FIGS. 3 to 5, an assembly slot (32) is formed on an opposite side of the positioning base (30) where the two mounting ridges (3) are located. The assembly slot (32) protrudes toward an area between the two mounting ridges (3) to form a protruding portion (33). The second magnetic component (4) is installed within the assembly slot (32).

Two holders (321) protrude from an inner bottom of the assembly slot (32). Furthermore, within the assembly slot (32), each holder (321) protruding from the inner bottom of the assembly slot (32) toward the slot opening direction, and each holder (321) is set in an L-shape (when viewing the holder (321) from top to bottom, it appears L-shaped). The second magnetic component (4) is positioned between these two holders (321) and the inner bottom of the assembly slot (32). The inner bottom of the assembly slot (32) has a U-shaped through hole (322) that penetrates through the protruding portion (33), which mainly serves to ensure that the first end of the second magnetic component (4) that is close to the first magnetic component (1) is not obstructed, thus maintaining optimal magnetic attraction. Each of the holders (321) has an inclined guiding surface (323) that faces the inner bottom of the assembly slot (32). The second magnetic component (4) abuts against the inclined guiding surfaces (323) of the holders (321), so that the first end of the second magnetic component (4) is close to the first magnetic component (1) when the lamp holder (10) and positioning base (30) are combined, and the second end of the second magnetic component (4) is positioned away from the first magnetic component (1). As a result, by installing the second magnetic component (4) at an incline, it can generate maximum/optimal magnetic attraction with the first magnetic component (1), thereby preventing the lamp holder (10) from too easily detaching from the positioning base (30).

As shown in FIG. 4, an angle (C) is formed between a first axial axis (A) of the second magnetic component (4), and a second axial axis (B) of the first magnetic component (1). The angle (C) is between 10 degrees and 32 degrees. Preferably, the angle (C) is 20.5 degrees.

In order to allow the users to quickly detach the lamp holder (10) from the positioning base (30), a pressing plate (301) extends from a top end of the positioning base (30) and toward the lamp holder (10). The pressing plate (301) is perpendicular to the positioning base (30). After the lamp holder (10) is installed on the positioning base (30), the user uses one finger to apply a downward pushing force to the pressing plate (301), and uses another finger to apply an upward pushing force to the lighting device (20). Since the lighting device (20) is pivotally connected to the lamp holder (10), moving the lighting device (20) will cause the lamp holder (10) to move along with it. By applying forces in opposite directions (up and down), the two mounting ridges (3) of the positioning base (30) will disengage from the two slots (2), thus allowing the lamp holder (10) together with the lighting device (20) to be detached from the positioning base (30), as shown in FIGS. 4 and 5.

Figure 13:
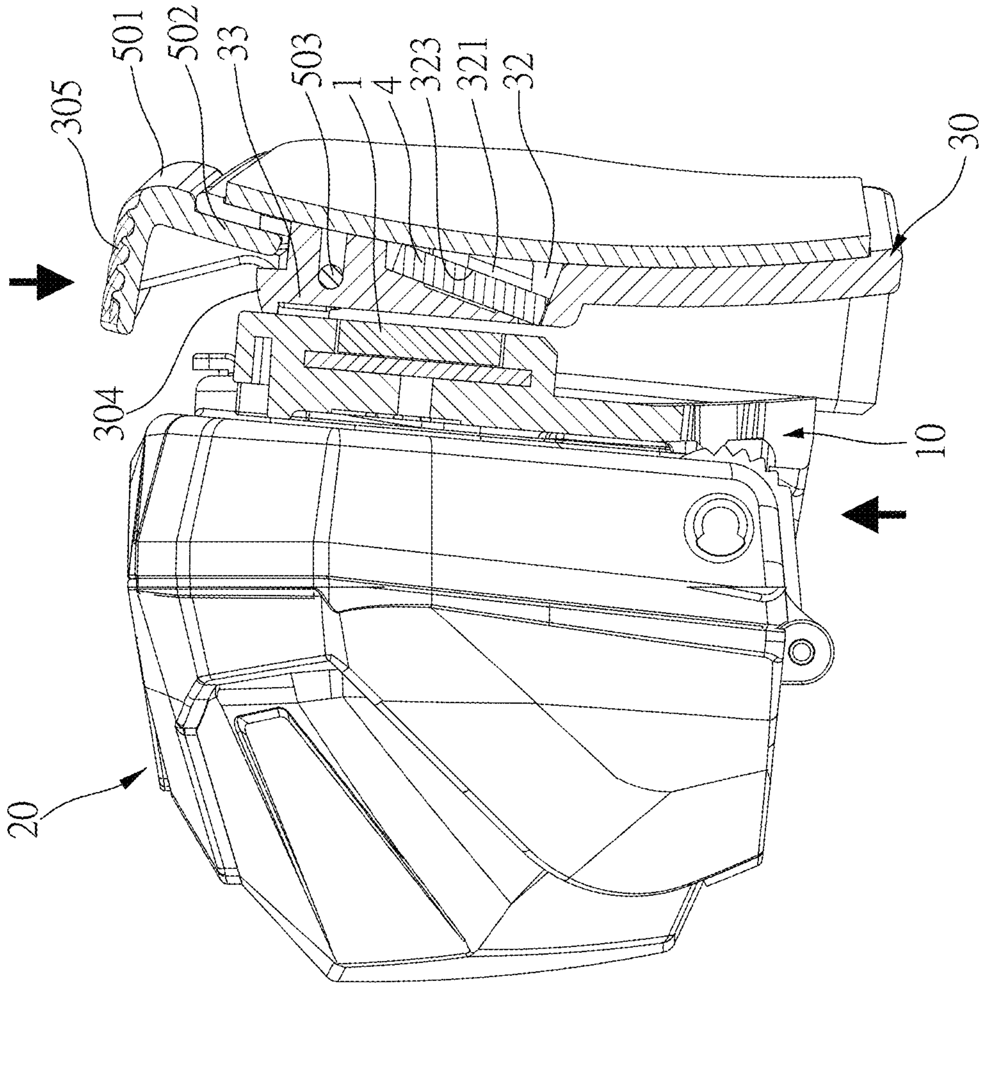
FIG. 13 is an operational view showing the upward pushing of the lamp holder in FIG. 10.
Figure 14:
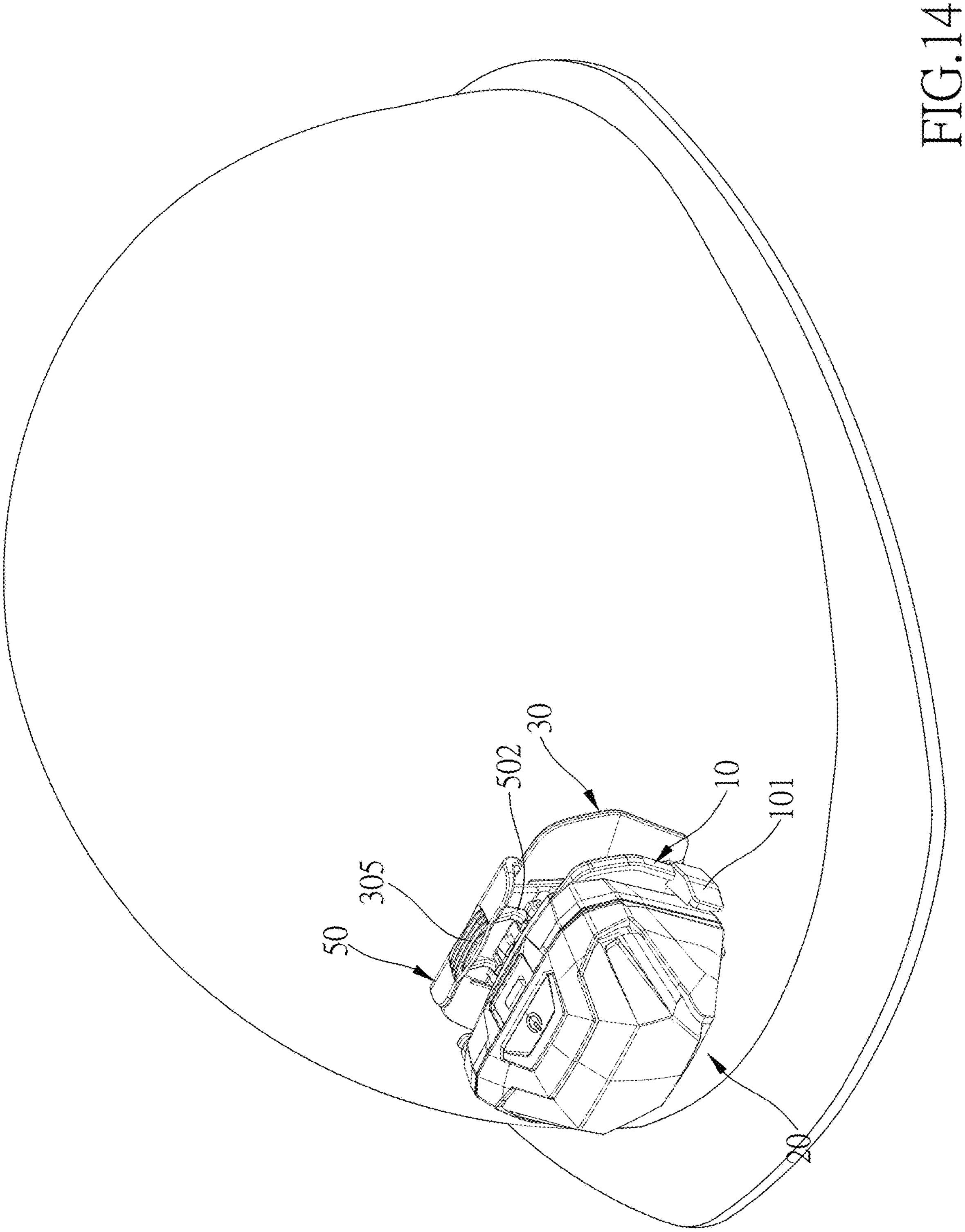
FIG. 14 is a view showing the second embodiment applied to a safety helmet.

As shown in FIGS. 7 through 14, the second embodiment of the present invention is shown. The second embodiment differs from the first embodiment in two aspects. First is the area of use, as shown in FIG. 6, to allow athletes to wear it on their head, two connecting portions (302) with <-shaped holes, are respectively formed to two sides of the positioning base (30). The strap (40) is flexibly installed on each connecting portion (302). In other words, the lamp holder (10) is installed on the strap (40), making it convenient for users to pull the strap (40) and wear it on their head (or other wearable positions). Alternatively, as shown in FIG. 13, it can be directly adhered to a safety helmet, utilizing the helmet wearing to provide illumination at construction sites.

Yet another difference between the second embodiment and the first embodiment is in the portion at the top of the positioning base (30). The pressing plate (301) in the first embodiment can be designed as a single piece with the positioning base (30), while in the second embodiment it is designed in a movable/pivotable form. The positioning base (30) includes a pivot base (303). A first end of a control member (50) is pivotally connected to the pivot base (303), and a second end of the control member (50) protrudes from the positioning base (30). When the lamp holder (10) and positioning base (30) are connected to each other, by pulling the second end of the control member (50), the first end of the control member (50) that is pivotally connected to the pivot base (303) pushes against the lamp holder (10), thereby partially releasing a magnetic attraction between the first magnetic component (1) and the second magnetic component (4). As a result, this allows for quick detachment of the lamp holder (10) from the positioning base (30) using an up-and-down pushing motion, as shown in FIGS. 8 through 13.

The control member (50) has two legs (502) formed to the first end thereof, and a pivot plate (501) formed to the second end of the control member (50). The two legs (502) are connected to the pivot plate (501). The two legs (502) are spaced apart, and are pivotally assembled to two sides of the pivot base (303). A pivot pin (503) passes through the pivot base (303) and the two legs (502). Each of the legs (502) has a push block (504) protruding therefrom and facing the lamp holder (10). When the pivot plate (501) is pulled toward the lamp holder (10), the leer plate portion (501) drives the two legs (502) to swing, causing the push blocks (504) to push against the lamp holder (10).

When pushed, the lamp holder (10) moves slightly. This movement of the lamp holder (10) partially releases (weakens) the magnetic attraction between the first magnetic component (1) and the second magnetic component (4). Then, using a single finger to apply downward pressure on the pivot plate (501), while simultaneously using another fingers to apply upward pushing force on the lighting device including lamp holder (10), these opposing forces allow the lamp holder (10) to be pushed upward and the two mounting ridges (3) to disengage from their connection with the two slots (2). This enables quick release of the installation between the lamp holder (10) and positioning base (30), as shown in FIGS. 8 through 13.

Figure 8:
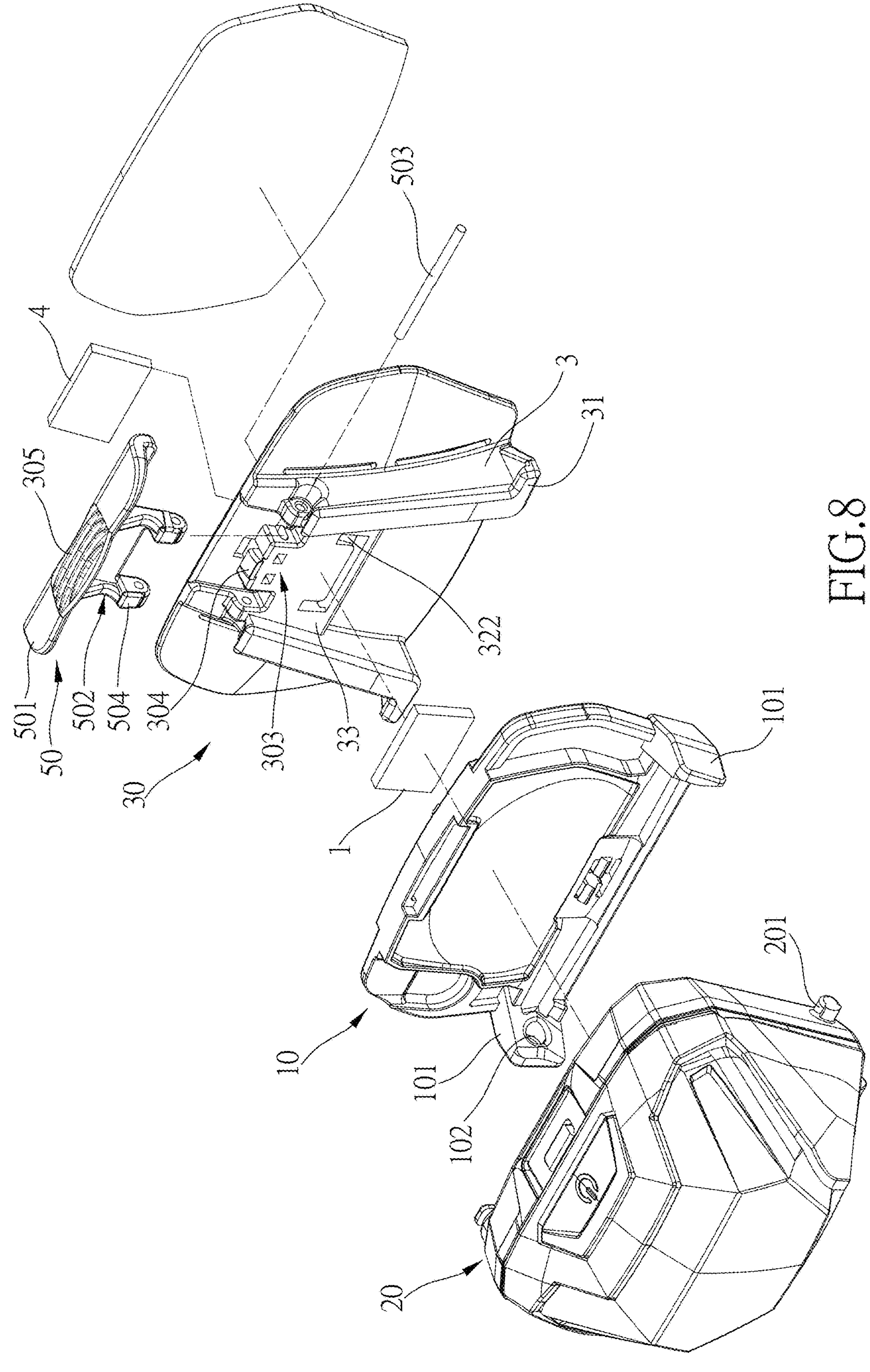
FIG. 8 is an exploded perspective view of the second embodiment of the present invention.

To prevent fingers from slipping when users operate the pivot plate (501), an anti-slip raised pattern (505) is formed to the top surface of the pivot plate (501). When users apply force with their fingers to pull the pivot plate (501) and partially release the magnetic attraction between the first magnetic component (1) and the second magnetic component (4), and when applying downward force to the pivot plate (501) to detach the lamp holder (10) from its assembly on the positioning base (30), the anti-slip raised pattern (505) creates friction with the fingers. This prevents any slipping issues during user operation, as shown in FIG. 8.

Figure 9:
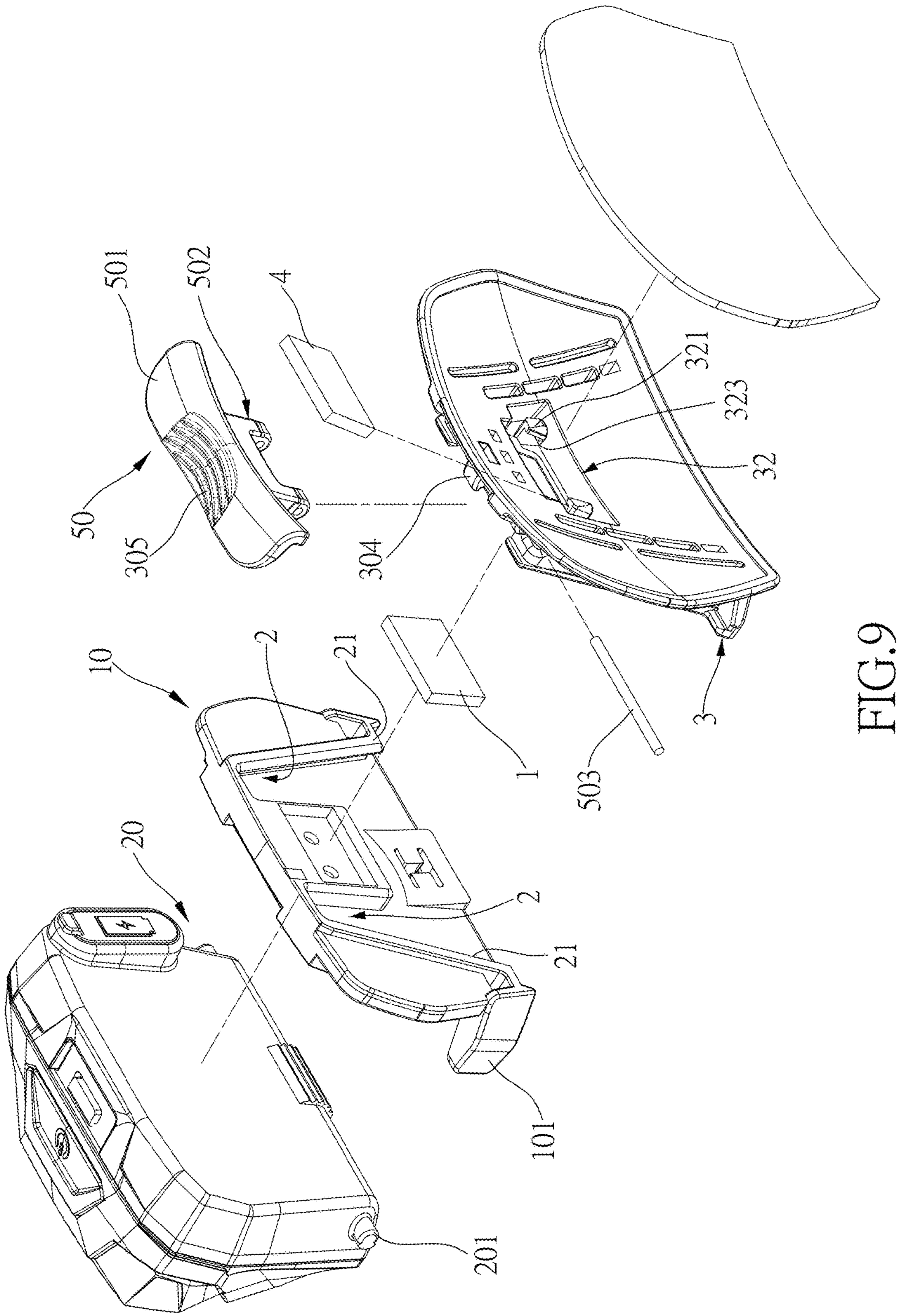
FIG. 9 is another angle of the exploded perspective view from FIG. 8.
Figure 10:
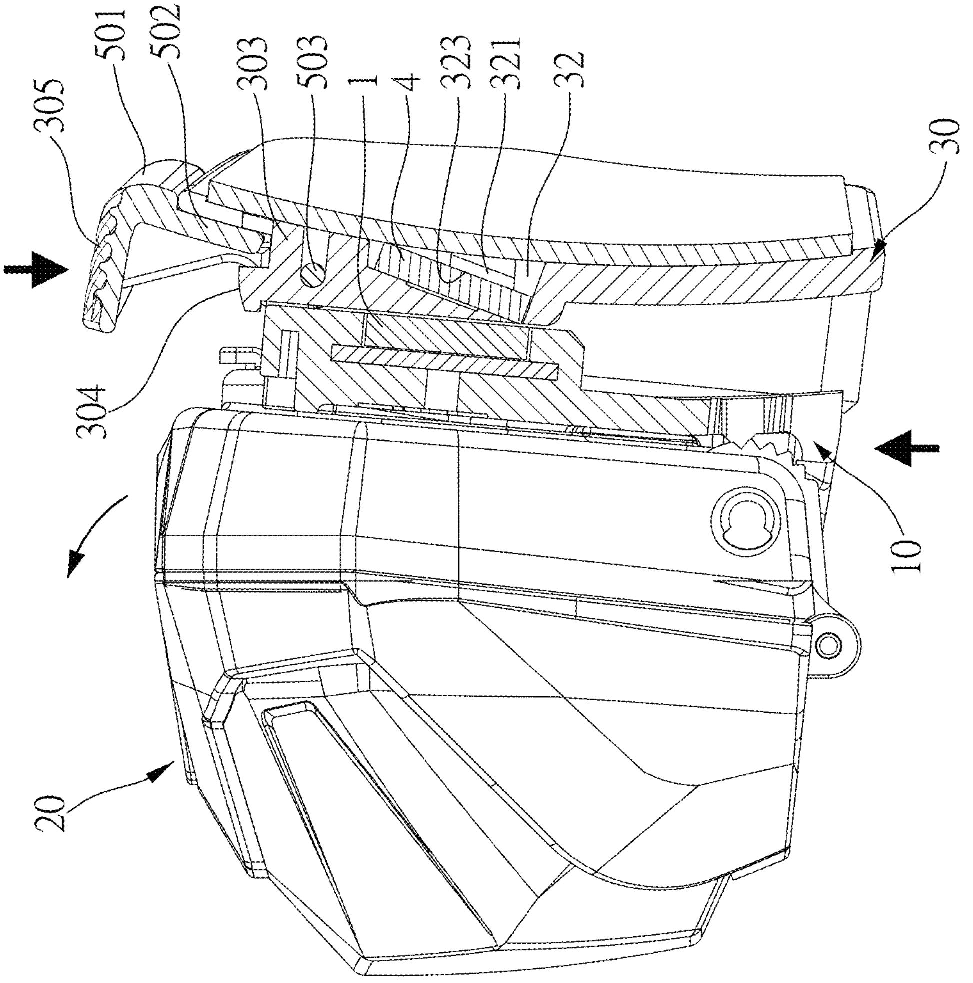
FIG. 10 is a sectional view, taken along line X-X of FIG. 7.
Figure 11:
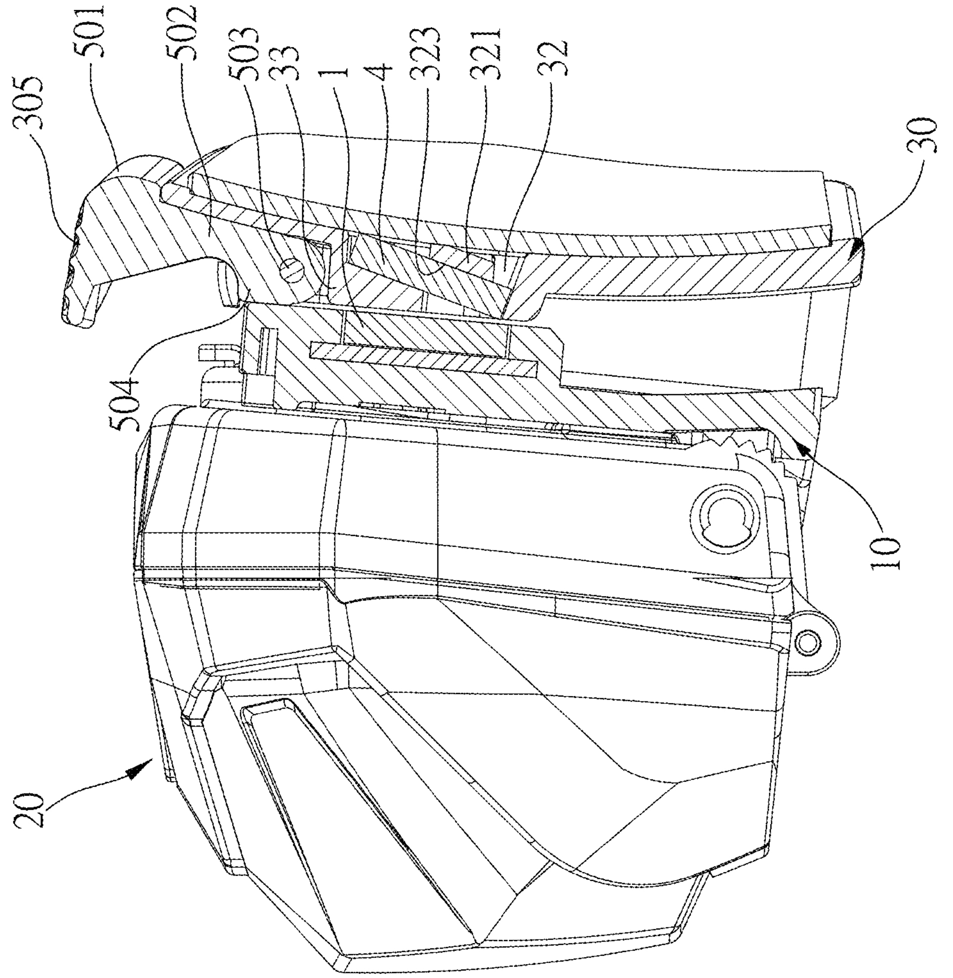
FIG. 11 is a sectional view, taken along line XI-XI of FIG. 7.
Figure 12:
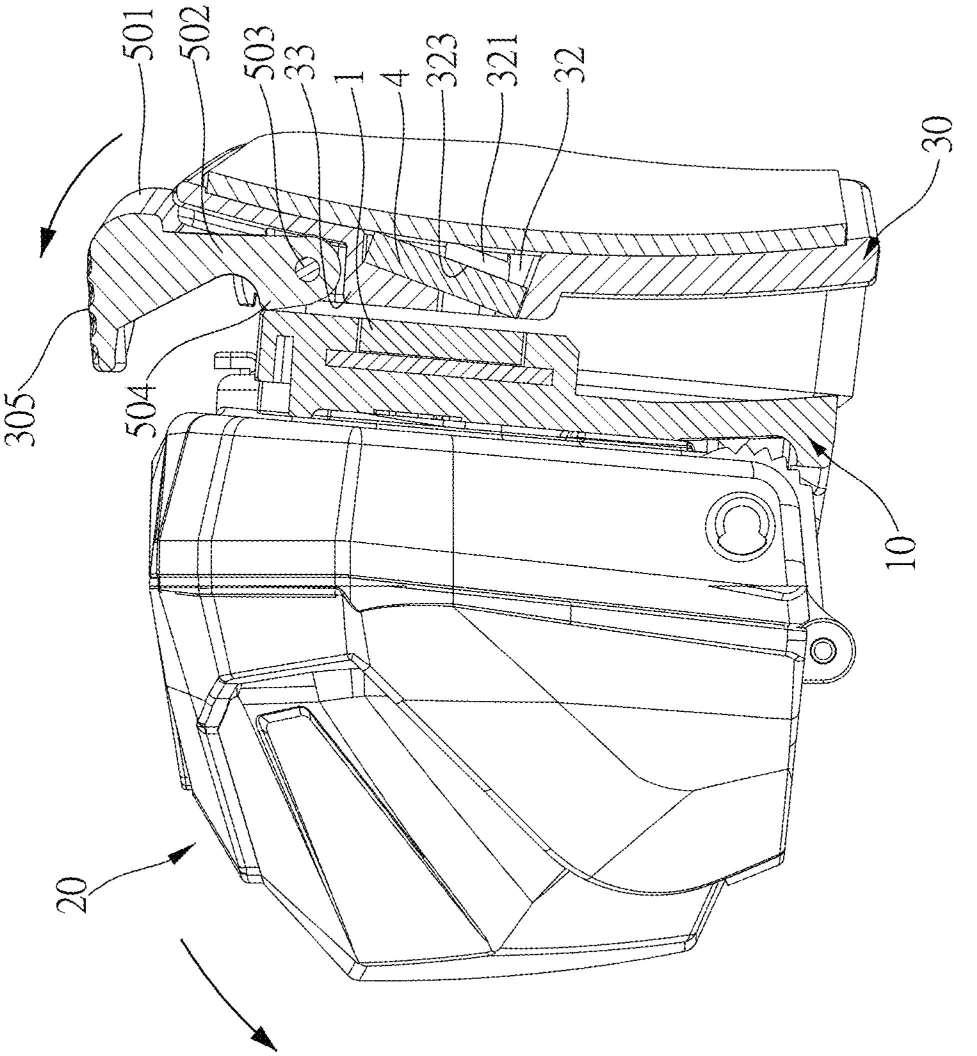
FIG. 12 is an operational view showing the movement of the pivot plate in FIG. 11.

In the use of the second embodiment, to prevent the lamp holder (10) from detaching too easily from the positioning base, a rib (304) is further protruded from a top end of the pivot base (303). When the lamp holder (10) and positioning base (30) are assembled, the rib (304) abuts against the lamp holder (10). This prevents the lamp holder (10) from detaching from the positioning base (30) before the control member (50) is actuated, as shown in FIGS. 9 and 10.

While we have shown and described the embodiment in accordance with the present invention, it should be clear to those skilled in the art that further embodiments may be made without departing from the scope of the present invention.

What is claimed is:

1. A lighting device mounting mechanism comprising:

a lamp holder (10) with a lighting device (20) pivotally connected to one side thereof, the other side of the lamp holder (10) having an embedded first magnetic component (1) and two recessed slots (2), the first magnetic component (1) located between the two slots (2), and a positioning base (30) detachably connected to the side of the lamp holder (10) that has the first magnetic component (1), the positioning base (30) having two protruding mounting ridges (3) that are engaged with the two slots (2), the two mounting ridges (3) being spaced apart with a second magnetic component (4) installed between the two mounting ridges (3), the lamp holder (10) and the positioning base (30) being combined with each other through a magnetic force between the first magnetic component (1) and the second magnetic component (4), the second magnetic component (4) having a first end thereof close to the first magnetic component (1) and a second end of the second magnetic component (4) located away from the first magnetic component (1), the second magnetic component (4) mounted at an inclined angle in the positioning base (30), wherein the side of the lamp holder (10) containing the first magnetic component (1)

approaches the side of the positioning base (30) containing the second magnetic component (4), the lamp holder (10) is guided onto the positioning base (30), the two mounting ridges (3) are engaged with the corresponding slots (2).

2. The lighting device mounting mechanism as claimed in claim 1, wherein two protrusions (101) vertically protrude from the side where the lamp holder (10) is connected to the lighting device (20), each protrusion (101) includes an axial hole (102) defined in an inner side thereof, the two respective axial holes (102) face each other, the lighting device (20) has two pivots (201) pivotally assembled into the axial holes (102), so that the lighting device (20) is pivotable relative to the lamp holder (10).

3. The lighting device mounting mechanism as claimed in claim 1, wherein a first blocking plate (21) extends from each slot (2) of the lamp holder (10) and toward the first magnetic component (1), a stopping surface (211) is formed on an inside side of each first blocking plate (21) corresponding to an interior of the slot (2), each mounting ridge (3) of the positioning base (30) having a second blocking plate (31) extending therefrom, when the lamp holder (10) approaches the positioning base (30) and is magnetically assembled through the magnetic force between the first magnetic component (1) and the second magnetic component (4), an outer surface of each second blocking plate (31) abuts against the stopping surface (211) of each first blocking plate (21).

4. The lighting device mounting mechanism as claimed in claim 1, wherein an assembly slot (32) is formed on an opposite side of the positioning base (30) where the two mounting ridges (3) are located, the assembly slot (32) is formed to protrude toward an area between the two mounting ridges (3) to form a protruding portion (33), the second magnetic component (4) is installed within the assembly slot (32).

5. The lighting device mounting mechanism as claimed in claim 4, wherein two holders (321) protrude from an inner bottom of the assembly slot (32), the second magnetic component (4) is positioned between these two holders (321) and the inner bottom of the assembly slot (32), each of the holders (321) has an inclined guiding surface (323) that faces the inner bottom of the assembly slot (32), the second magnetic component (4) abuts against the inclined guiding surfaces (323) of the holders (321), so that the first end of the second magnetic component (4) is close to the first magnetic component (1) when the lamp holder (10) and positioning base (30) are combined, the second end of the second magnetic component (4) is positioned away from the first magnetic component (1).

6. The lighting device mounting mechanism as claimed in claim 1, wherein a pressing plate (301) extends from a top end of the positioning base (30) and toward the lamp holder (10), after the lamp holder (10) is installed on the positioning base (30), when a downward pushing force is applied to the pressing plate (301) and an upward pushing force is applied to the lighting device (20), the two mounting ridges (3) of the positioning base (30) are disengaged from the two slots (2).

7. The lighting device mounting mechanism as claimed in claim 1, wherein two connecting portions (302) respectively formed to two sides of the positioning base (30), a strap (40) is installed on each connecting portion (302).

8. The lighting device mounting mechanism as claimed in claim 1, wherein an angle (C) is formed between a first axial axis (A) of the second magnetic component (4) and a second axial axis (B) of the first magnetic component (1), the angle (C) is between 10 degrees and 32 degrees.

9. The lighting device mounting mechanism as claimed in claim 1, wherein the positioning base (30) includes a pivot base (303), a first end of a control member (50) is pivotally connected to the pivot base (303), a second end of the control member (50) protrudes from the positioning base (30), when the lamp holder (10) and positioning base (30) are connected to each other, by pulling the second end of the control member (50), the first end of the control member (50) that is pivotally connected to the pivot base (303) pushes against the lamp holder (10), thereby partially releasing a magnetic attraction between the first magnetic component (1) and the second magnetic component (4).

10. The lighting device mounting mechanism as claimed in claim 9, wherein a rib (304) protrudes from a top end of the pivot base (303), when the lamp holder (10) and the positioning base (30) are assembled together, the rib (304) abuts against the lamp holder (10).

11. The lighting device mounting mechanism as claimed in claim 9, wherein the control member (50) has two legs (502) formed to the first end thereof, and a pivot plate (501) formed to the second end of the control member (50), the two legs (502) are connected to the pivot plate (501), the two legs (502) are spaced apart, the two legs (502) are pivotally assembled to two sides of the pivot base (303), a pivot pin (503) passes through the pivot base (303) and the two legs (502), each of the legs (502) has a push block (504) protruding therefrom and facing the lamp holder (10), when the pivot plate (501) is pulled toward the lamp holder (10), the leer plate portion (501) drives the two legs (502) to swing, causing the push blocks (504) to push against the lamp holder (10), when the lamp holder (10) is pushed, the magnetic attraction between the first magnetic component (1) and the second magnetic component (4) is partially released, the lamp holder (10) is pushed upward and the two mounting ridges (3) are disengaged from the two slots (2).

12. The lighting device mounting mechanism as claimed in claim 11, wherein the pivot plate (501) includes an anti-slip raised pattern (505) formed to a top surface thereof, after applying a force to pull the pivot plate (501) and partially releasing the magnetic attraction between the first magnetic component (1) and the second magnetic component (4), a downward force is then applied to the pivot plate (501) while simultaneously applying an upward pushing force to the lamp holder (10), thereby detaching the lamp holder (10) from the positioning base (30), the anti-slip raised pattern (505) creates friction when the force is applied to pull the pivot plate (501).

* * * * *